(12) United States Patent
Cherry

(10) Patent No.: US 12,048,372 B2
(45) Date of Patent: Jul. 30, 2024

(54) GRILL GRATE CLEANING TOOL

(71) Applicant: Ralph Cherry, Newnan, GA (US)

(72) Inventor: Ralph Cherry, Newnan, GA (US)

( * ) Notice: Subject to any disclaimer, the term of this patent is extended or adjusted under 35 U.S.C. 154(b) by 336 days.

(21) Appl. No.: 17/394,353

(22) Filed: Aug. 4, 2021

(65) Prior Publication Data

US 2022/0361656 A1 Nov. 17, 2022

Related U.S. Application Data

(60) Provisional application No. 63/188,654, filed on May 14, 2021.

(51) Int. Cl.
*A46B 9/00* (2006.01)
*A46B 5/00* (2006.01)
*A46B 15/00* (2006.01)
*A47J 37/07* (2006.01)

(52) U.S. Cl.
CPC ............... *A46B 9/005* (2013.01); *A46B 5/00* (2013.01); *A46B 15/0095* (2013.01); *A47J 37/0786* (2013.01); *A46B 2200/3073* (2013.01); *A46B 2200/3093* (2013.01)

(58) Field of Classification Search
CPC .......... A47L 13/02; A47L 13/08; A47L 13/34; A47L 17/06; A47L 13/00; B26B 25/005; B26B 25/00; A46B 9/005; A46B 5/00; A46B 15/0095; A46B 2200/3033; A46B 2200/3073; A46B 2200/3093; A47J 37/0786; A21C 9/063; A21C 11/006; A01K 13/002

USPC ......... 30/169, 170, 171, 172, 299, 304, 306, 30/307, 503.5, 365, 347; 83/411.5, 411.6, 83/425, 425.2; 15/143.1, 169, 236.01, 15/236.05, 236.06; 119/600, 610, 611, 119/612, 617, 631

See application file for complete search history.

(56) References Cited

U.S. PATENT DOCUMENTS

| | | | | |
|---|---|---|---|---|
| 2,304,759 | A * | 12/1942 | Carroll | A21C 11/12 29/6.1 |
| 3,514,854 | A * | 6/1970 | Norfleet | A47L 13/02 30/292 |
| 5,735,014 | A * | 4/1998 | Noga | A47J 37/0786 15/236.08 |
| 7,275,278 | B1 * | 10/2007 | Martin | A47L 13/34 15/236.01 |
| 10,376,038 | B2 * | 8/2019 | Axelrod | A46B 5/0095 |
| 2008/0066322 | A1 * | 3/2008 | Shin | B26B 5/008 30/306 |
| 2011/0180664 | A1 * | 7/2011 | Bartels | B64D 11/00155 244/118.5 |
| 2017/0055689 | A1 * | 3/2017 | Gunjian | A46B 3/18 |

(Continued)

*Primary Examiner* — Brian D Keller
*Assistant Examiner* — Alberto Saenz
(74) *Attorney, Agent, or Firm* — Barry Choobin; Patent 360

(57) ABSTRACT

A cleaning tool for cleaning accumulated charred food material on grill grates. The cleaning tool is of a two-prong tuning fork shape that has a handle and a cleaning head. A shaft extends between the two prongs of the cleaning head. Several cleaning discs are slidably provided between the two prongs over the shaft wherein two adjacent cleaning discs are separated by one or more spacer discs. the cleaning discs scrap the accumulated material from the grill bars.

17 Claims, 3 Drawing Sheets

(56) References Cited

U.S. PATENT DOCUMENTS

2018/0279756 A1\* 10/2018 Axelrod .............. A46B 5/0095
2020/0037844 A1\* 2/2020 Duguay ................ A47L 13/08

\* cited by examiner

GRILL GRATE CLEANING TOOL

FIELD OF INVENTION

The present invention relates to a cleaning tool, and more particularly the present invention relates to a cleaning tool for grates or grill bars of grills.

BACKGROUND

Grills are commonly used to cook food, such as barbeque, wherein the food item is directly placed on the grate. However, charred debris from the cooked food item routinely gets accumulated on the bars and groves of the grate. The grate must be cleaned from the accumulated debris which can become hard and time-consuming. Many tools are available in the market to scour the grill bars, however, known tools are often unsatisfactory. Such known tools are costly and complex in construction.

Thus, a need is appreciated for a cleaning tool that overcomes the drawbacks of known cleaning tools for grill grates.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a cleaning tool for grill grates that is devoid of the drawbacks of known cleaning tools.

It is another object of the present invention that the cleaning tool is economical to manufacture.

It is still another object of the present invention that the cleaning tool can be customized according to the spacings between the grill bars.

It is still another object of the present invention that the cleaning tool is easy to use.

It is yet another object of the present invention that the cleaning tool can be repaired easily.

It is a further object of the present invention that the cleaning tool is light in weight.

It is still a further object of the present invention that the cleaning tool can be used to clean hot flaming grills.

It is yet a further object of the present invention that the cleaning tool is resistant to corrosion and dishwasher safe.

It is an additional object of the present invention that the cleaning tool is durable and dishwasher safe.

In one aspect, disclosed is a cleaning tool for grill grates. The cleaning tool may include a handle portion that has a proximal end and a distal end; a pair of elongated metal bars extend from the proximal end of the handle portion, the pair of elongated metal bars have a first metal bar and a second metal bar, the first metal bar and the second metal bar curve outwards to form a U-shape head portion, the head portion has a first end and a second end; a first aperture in the first metal bar of the head portion at the first end; a second aperture in the second metal bar of the head portion at the second end; a shaft that has a head at one end and a trailing end on an opposite end, the trailing end of the shaft can be removably inserted into the first aperture and exit from the second aperture, wherein the trailing end can be secured by a fastener; a plurality of cleaning discs slid over the shaft between the first end and the second end, each of the plurality of cleaning discs has a first diameter, each of the plurality of cleaning discs has an aperture dimensioned to receive the shaft; and one or more spacer discs provided between adjacent cleaning discs of the plurality of cleaning discs, each of the one or more spacer discs has a second diameter, wherein the second diameter is less than the first diameter, wherein a number of spacer discs between the adjacent cleaning discs are proportional to the spacing between the adjacent cleaning discs. The cleaning tool may further include a first spring slid over the shaft between the first metal bar and a cleaning disc of the plurality of cleaning discs; and a second spring slid over the shaft at an opposite end between the second metal bar and a cleaning disc of the plurality of cleaning discs, wherein the first spring and the second spring can be configured to produce desired tension between the plurality of cleaning discs, and wherein a thickness of the first spring and the second spring can be proportional to the desired tension between the plurality of cleaning discs.

In one implementation of the cleaning tool, the handle can be wooden and the distal end of the handle can have a loop for hanging the cleaning tool to a peg. In one case the pair of elongated metal bars, the shaft, the plurality of cleaning discs, and the one or more spacer discs are made of metal, such as stainless steel.

In one aspect is disclosed a method for cleaning grill grates, the method includes the steps of providing the cleaning tool as described above and rolling the cleaning tool over the grill grates such as the plurality of cleaning discs scrapes accumulated material on the grill grates.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
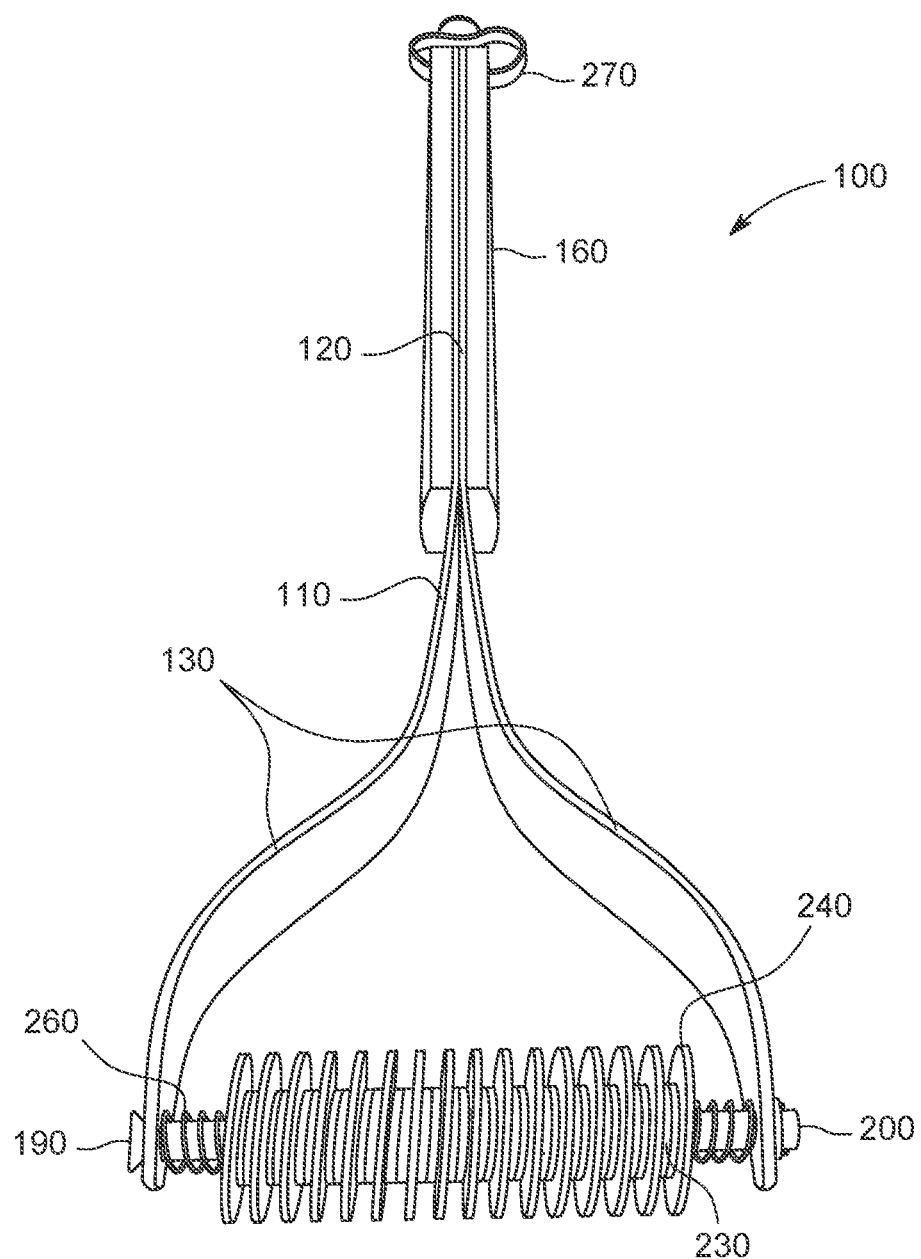
FIG. 1 is a perspective view of the cleaning tool for grill grates, according to an exemplary embodiment of the present invention.

Referring to FIG. 1 which shows an exemplary embodiment of the disclosed cleaning tool 100 for cleaning the grill grates of a grill, such as a barbeque grill. The cleaning tool 100 can include a pair of metal bars 110 each has an elongated thin and narrow width profile. Each metal bar can include a flat portion 120 and a curved portion 130. The flat portion 120 can be straight while the curved portion 130 can curve outwards to a fork shape. Each bar of the two metal bars can be placed against each other such as the flat portions 120 of the two metal bars can juxtapose while the curved portions 130 can curve outwards in opposite directions to form an inverted bell shape or U-shape head portion 140. The two flat portions of the two metal bars can be coupled to form a handle 150 of the cleaning tool. Additionally, an insulating material can cover the two metal bars, such as a user can grasp the handle. For example, a wooden cover 160 can encase the two metal bars to form the handle 150 that can be heat resistant and could be easily grasped. The cleaning tool including the handle portion and the head portion can resemble a two-prong tuning fork but can be rigid. It is to be understood that the flat portions can be of any other shape such as semicircle, wherein the two semicircle shape bars can form a round shape handle. The metal bars can be made of any metal such as stainless steel that can be strong and durable. Preferably the metal bars can be made from corrosion-resistant material and includes alloys. The handle can be secured by fasteners, such as screws, bolts, or rivets.

The inverted bell shape or U-shape head portion 140 of the cleaning tool 100 can have two ends, i.e., first end and the second end, wherein each end can have an aperture 170. An elongated shaft 180 can pass through the two apertures 170 in the head portion 140 of the cleaning tool 100. An inner diameter of the apertures 170 can be proportional to an outer diameter of the shaft 180 such as the shaft 180 can fit into the two apertures 170. One end of the shaft 180 can have a head 190 of a diameter larger than the inner diameter of the two apertures, such as the head of the shaft can be retained on the metal bar while the shaft 180 can pass through the two apertures 170.

Figure 2:
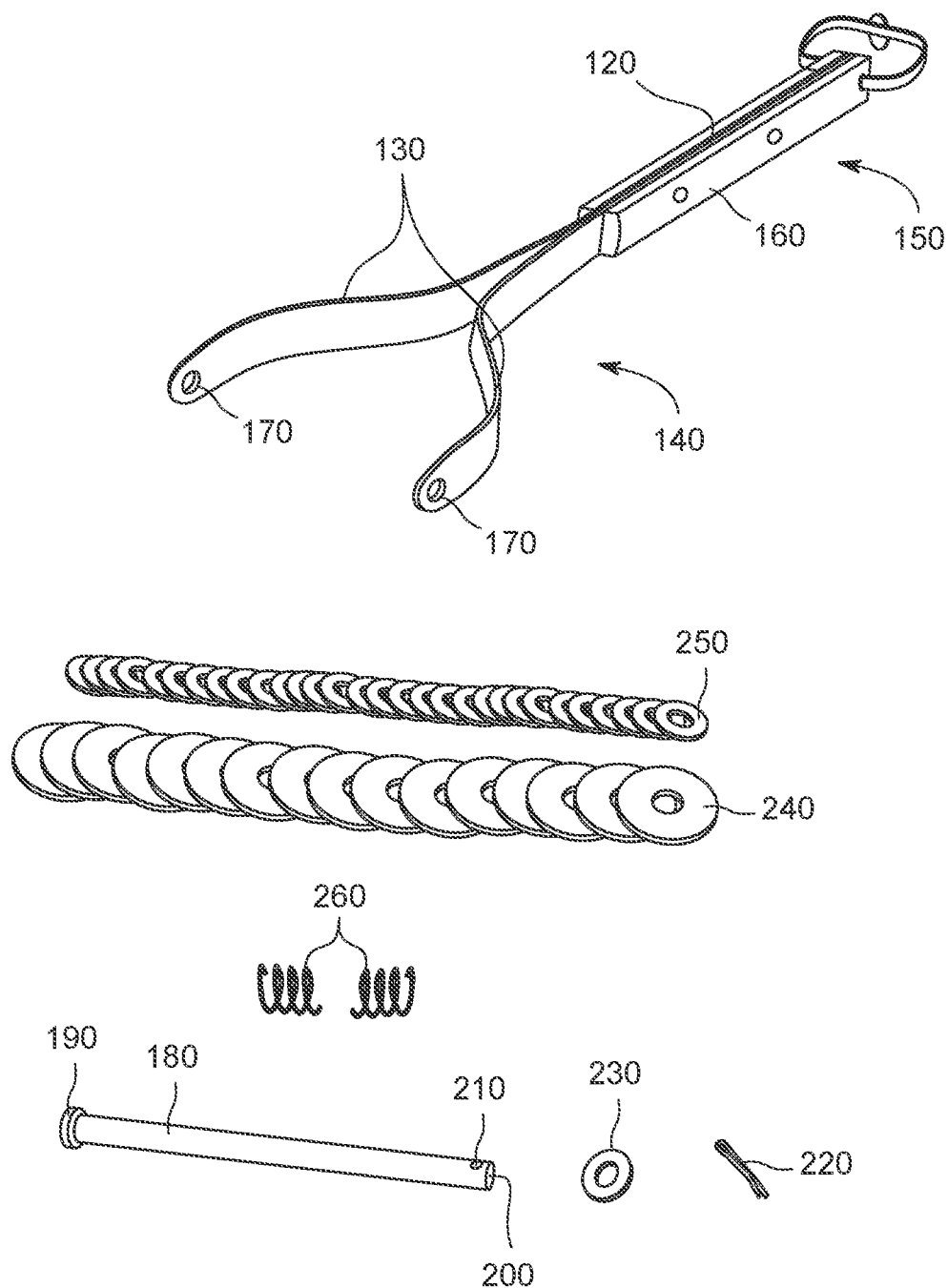
FIG. 2 is an exploded view of the cleaning tool, according to an exemplary embodiment of the present invention.

The other end of the shaft, referred to herein as the trailing end 200 i.e., opposite to the head 190, the trailing end can be inserted into the two apertures 170 and exit through one of the apertures as shown in FIG. 1. As shown in FIG. 2, the head portion of the cleaning tool has two apertures 170 and a shaft 180 extends through these two apertures. One end of the shaft 180 has the head 190 and the trailing end 200 of the shaft 180 has a hole 210. A hook pin 220 can be inserted in this hole 210 for securing the shaft and a washer 230 can also be used. The hook pin can be of drilled clevis style, grooved clevis, or double grooved headless pin. Snap rings and cotter pins can be used to secure the pin ends. Cleaning discs 240 having a central aperture of a diameter larger than the outer diameter of the shaft 180 can be provided. The cleaning discs 240 can be slid over the shaft between the two apertures as shown in FIG. 1. Spacer discs 250 can be used to provide spacings between the cleaning discs 240. The spacer discs 250 can be smaller in size than the cleaning discs and includes an aperture at the center such as the spacer discs can also slide over the shaft. In one case, the spacings between the adjacent cleaning discs can be proportional to a spacing between adjacent grill bars. The spacings between the adjacent cleaning discs can be increased or decreased by increasing or decreasing the number of spacer discs between the cleaning discs. Two springs 260 can also be provided at two ends of the shaft for desired tension between the cleaning discs and permit the cleaning discs to have the desired scraping angle for effective grate cleaning. As shown in FIG. 1, two springs 260 can be provided at two ends of the shaft 180.

In one case, a user can adjust the spacing between the cleaning discs by removing the fastener in the shaft, such as the hook pin shown in FIG. 2. It is to be understood that the shaft can be secured by any fastener, such as the hook pin 220 shown in FIG. 2, and any such fastener is within the scope of the present invention. Thereafter the shaft can be withdraw resulting in the removal of the cleaning discs and the spacer discs from the shaft. Thereafter, the cleaning discs and spacer discs in desired combinations can be slid over the shaft, wherein the desired combination depends upon the desired spacing between the cleaning discs. For example, a user can grasp the two cleaning discs with one or more spacer discs between the two-cleaning disc between the thumb and finger to get the desired combination. The shaft can then be inserted into the aperture and secured by the fastener. Spring can also be added at two ends for the desired tension as shown in FIG. 1. The thickness along with springs can be changed for different tension required.

In one case, the cleaning tool can be approx. 20 inches long, the handle can be about 12 inches long, and the two ends of the head portion can be about 4 inches wide. A loop 270 can also be provided at end of the handle for mounting the cleaning tool to a peg.

Figure 3:
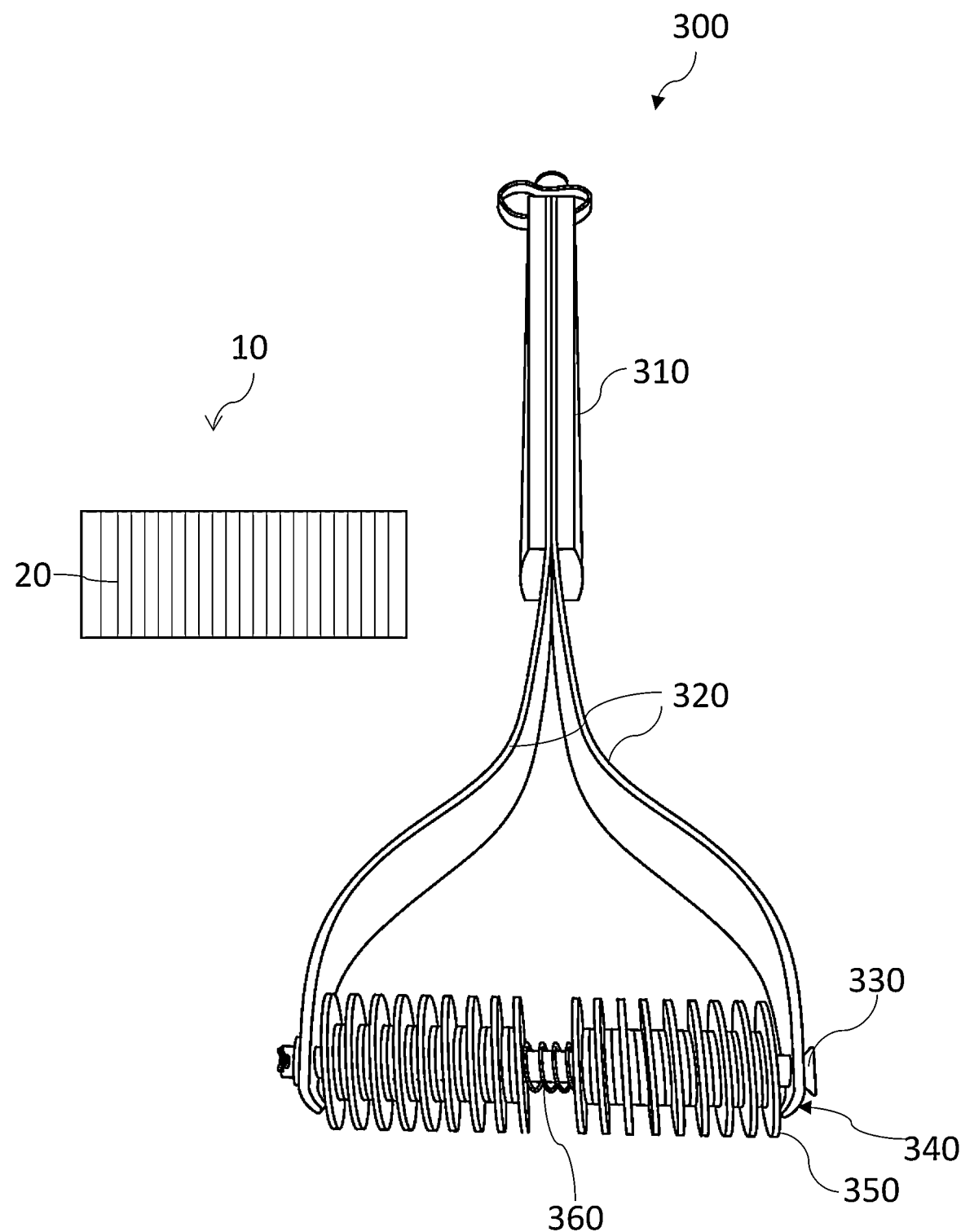
FIG. 3 is a perspective view of another exemplary embodiment of the cleaning tool, according to the present invention.

Referring to FIG. 3 which shows another exemplary embodiment of the disclosed cleaning tool 300. The cleaning tool 300 can have handle 310 and a pair of metal bars 320. The end 340 of each metal bar 320 is tapered inwards towards an adjascent cleaning disc 350. The tapered end of the metal bar can be useful for cleaning the bars of a grill, in particular a bar of a grill that is difficult to reach for cleaning. The bar of grill can be received between the tapered end 340 and the adjacent cleaning disc 350, wherein the cleaning tool can be rolled to scrape off the accumulated debris from the grill bar. Also, a spring 360 can be provided in mid of the shaft 330 with cleaning discs at both ends of the spring 360. FIG. 3 also show a grill grates 10 that includes multiple bars 20.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A cleaning tool for cleaning grill grates, the cleaning tool comprises:
   a handle portion that has a proximal end and a distal end;
   a pair of elongated metal bars that extends from the proximal end of the handle portion, the pair of elongated metal bars has a first metal bar and a second metal bar, the first metal bar and the second metal bar curve outwards to form a U-shaped head portion of the cleaning tool, the U-shaped head portion has a first end and a second end, wherein the first end and the second end are further extended and tapered inwards forming tapered ends;
   a first aperture in the first metal bar of the U-shaped head portion at the first end;
   a second aperture in the second metal bar of the U-shaped head portion at the second end;
   a shaft has a head at one end and a trailing end on an opposite end, the trailing end of the shaft inserted through the first aperture and exit from the second aperture, wherein the trailing end is secured by a fastener, the shaft fixedly coupled to the U-shaped head portion;
   a plurality of cleaning discs slid over the shaft between the first end and the second end, each of the plurality of cleaning discs is of a first diameter, each of the plurality of cleaning discs has an aperture of a size to receive the shaft; and
   one or more spacer discs slid over the shaft and disposed between adjacent cleaning discs of the plurality of cleaning discs, each of the one or more spacer discs has a second diameter, wherein the second diameter is less than the first diameter, wherein a number of spacer discs between the adjacent cleaning discs is proportional to a desired spacing between the adjacent cleaning discs.

2. The cleaning tool according to claim 1, wherein the cleaning tool further comprises:
   a first spring slid over the shaft between the first metal bar and a cleaning disc of the plurality of cleaning discs; and
   a second spring slid over the shaft at an opposite end between the second metal bar and a cleaning disc of the plurality of cleaning discs,
   wherein the first spring and the second spring are configured to produce desired tension between the plurality of cleaning discs.

3. The cleaning tool according to claim 2, wherein a thickness of the first spring and the second spring is proportional to the desired tension between the plurality of cleaning discs.

4. The cleaning tool according to claim 1, wherein the handle portion is wooden, the distal end of the handle portion has a loop for hanging the cleaning tool.

5. The cleaning tool according to claim 1, wherein the pair of elongated metal bars, the shaft, the plurality of cleaning discs, and the one or more spacer discs are made of metal.

6. The cleaning tool according to claim 5, wherein the metal is stainless steel.

7. The cleaning tool of claim 1, wherein the U-shaped head portion is of a two-prong tuning fork shape.

8. The cleaning tool according to claim 1, wherein the desired spacing between the adjacent cleaning discs is proportional to a spacing between adjacent bars of the grill grates.

9. The cleaning tool according to claim 1, wherein the cleaning tool further comprises a spring slid over the shaft and positioned in a middle of the shaft.

10. A method for cleaning grill grates, the method comprising the steps of:
    providing a cleaning tool comprising:
       a handle portion that has a proximal end and a distal end,
       a pair of elongated metal bars that extends from the proximal end of the handle portion, the pair of elongated metal bars has a first metal bar and a second metal bar, the first metal bar and the second metal bar curve outwards to form a U-shaped head portion of the cleaning tool, the U-shaped head portion has a first end and a second end, wherein the first end and the second end are further extended and tapered inwards to form tapered ends,
       a first aperture in the first metal bar of the U-shaped head portion at the first end,
       a second aperture in the second metal bar of the U-shaped head portion at the second end,
       a shaft has a head at one end and a trailing end on an opposite end, the trailing end of the shaft inserted through the first aperture and exit from the second aperture, wherein the trailing end is secured by a fastener, the shaft fixedly coupled to the U-shaped head portion,
       a plurality of cleaning discs slid over the shaft between the first end and the second end, each of the plurality of cleaning discs is of a first diameter, each of the plurality of cleaning discs has an aperture of a size to receive the shaft, and
       one or more spacer discs slid over the shaft and disposed between adjacent cleaning discs of the plurality of cleaning discs, each of the one or more spacer discs has a second diameter, wherein the second diameter is less than the first diameter,
    wherein a number of spacer discs between the adjacent cleaning discs is proportional to a desired spacing between the adjacent cleaning discs; and
    cleaning the grill grates using the cleaning tool.

11. The method according to claim 10, wherein the cleaning tool further comprises:
    a first spring slid over the shaft between the first metal bar and a cleaning disc of the plurality of cleaning discs; and
    a second spring slid over the shaft at an opposite end between the second metal bar and a cleaning disc of the plurality of cleaning discs,
    wherein the first spring and the second spring are configured to produce desired tension between the plurality of cleaning discs.

12. The method according to claim 11, wherein a thickness of the first spring and the second spring is proportional to the desired tension between the plurality of cleaning discs.

13. The method according to claim 10, wherein the U-shaped head portion is of a two-prong tuning fork shape.

14. The method of claim 10, wherein the cleaning tool further comprises a spring slid over the shaft and positioned in a middle of the shaft.

15. The method of claim 10, wherein the method further comprises:
   receiving a bar of grill grates between a tapered end of the tapered ends and an adjacent cleaning disc for scraping the bars of the grill grates.

16. A method for cleaning grill grates, the method comprising the steps of:
   providing a cleaning tool comprising:
      a handle portion that has a proximal end and a distal end,
      a pair of elongated metal bars that extends from the proximal end of the handle portion, the pair of elongated metal bars has a first metal bar and a second metal bar, the first metal bar and the second metal bar curve outwards to form a U-shaped head portion of the cleaning tool, the U-shaped head portion has a first end and a second end,
      a first aperture in the first metal bar of the U-shaped head portion at the first end,
      a second aperture in the second metal bar of the U-shaped head portion at the second end,
      a shaft has a head at one end and a trailing end on an opposite end, the trailing end of the shaft inserted through the first aperture and exit from the second aperture, wherein the trailing end is secured by a fastener, the shaft fixedly coupled to the U-shaped head portion,
      a plurality of cleaning discs slid over the shaft between the first end and the second end, each of the plurality of cleaning discs is of a first diameter, each of the plurality of cleaning discs has an aperture of a size to receive the shaft, and
      one or more spacer discs slid over the shaft and disposed between adjacent cleaning discs of the plurality of cleaning discs, each of the one or more spacer discs has a second diameter, wherein the second diameter is less than the first diameter,
      wherein a number of spacer discs between the adjacent cleaning discs is proportional to a desired spacing between the adjacent cleaning discs, wherein the desired spacing between the adjacent cleaning discs is proportional to a spacing between adjacent bars of the grill grates;
   cleaning the grill grates using the cleaning tool; and
   adding one or more spacer discs between the adjacent cleaning discs so that the spacing between the adjacent cleaning discs corresponds to the spacing between the adjacent bars.

17. The method of claim 16, wherein the method further comprises:
   removing one or more spacer discs between the adjacent cleaning discs so that the spacing between the adjacent cleaning discs corresponds to the spacing between the adjacent bars.

\* \* \* \* \*